Dec. 24, 1968   R. GERMANN   3,418,583
DEVICE FOR THE TWICE-REPEATED TRIGGERING OF
CATHODE-RAY OSCILLOSCOPES
Filed Oct. 22, 1965
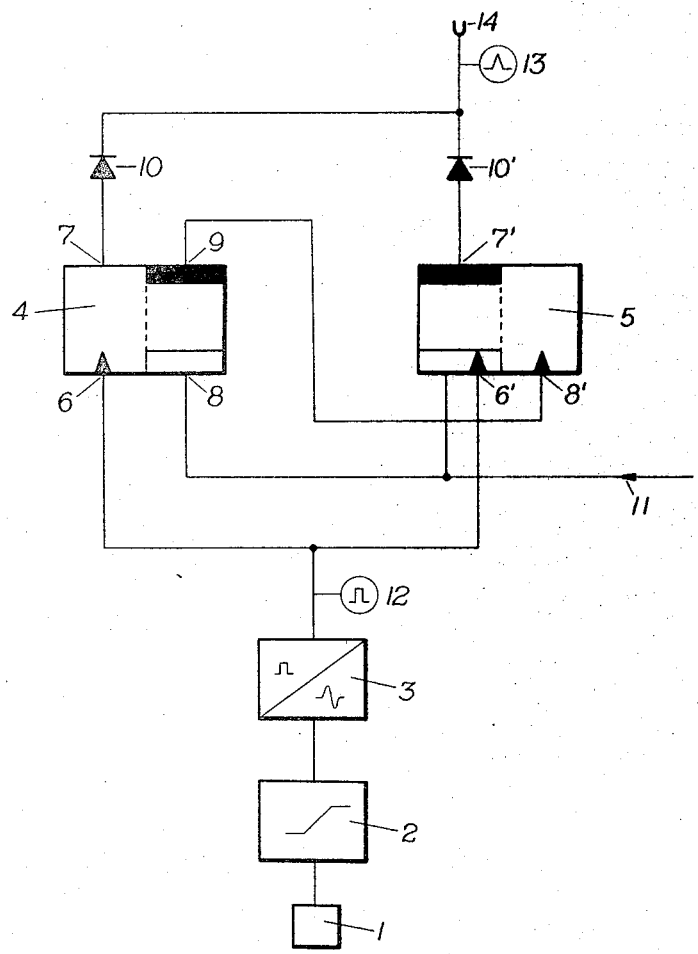
Inventor
Reimar Germann
By
Watson, Cole, Grindle + Watson
Attys.

United States Patent Office 3,418,583
Patented Dec. 24, 1968

3,418,583
DEVICE FOR THE TWICE-REPEATED TRIGGERING OF CATHODE-RAY OSCILLOSCOPES
Reimar Germann, Graz, Austria, assignor to Hans List, Graz, Austria
Filed Oct. 22, 1965, Ser. No. 501,789
Claims priority, application Austria, Oct. 27, 1964, A 9,107/64
1 Claim. (Cl. 328—48)

The invention relates to a device for the twice-repeated triggering of cathode-ray oscilloscopes by means of signals produced by an electromagnetic impulse generator and transformed into square-wave impulses via a limiting stage in a pulse shaper, for the joint recording of the compression and charge variance diagrams, particularly in connection with the indication of internal combustion engines and compressors featuring an impulse sequence at intervals of 180° crank angle each for two-stroke engines and of 360° crank angle each for four-stroke engines.

Indication of internal combustion engines and compressors frequently involves the necessity of recording not only the compression diagram but also the charge variance diagram also for the purpose of obtaining in the oscillograph curve a zero line corresponding to atmospheric pressure. When pressure is recorded continuously such as by means of a recording oscilloscope, this zero line can be easily transferred to the compression diagram since several operations are consecutively recorded on a recorder chart. This is also possible if a cathode-ray oscilloscope is used for recording, provided the sweep of the oscilloscope has been set in such a manner that the pressure pattern for two-stroke engines is recorded via a crank angle varying from 0 to 360° and for four-stroke engines via a crank angle varying from 0 to 720°. The serious drawback inherent in this arrangement resides in the fact that the sector of the recorded diagram under observation represents only a small section of the available pattern.

According to another conventional method of jointly recording the compression and charge variance diagrams in a single oscillogram consists in several consecutive releases of the cathode-ray oscilloscope, with both the compression and the charge variance diagram appearing as a single image, but such a photographic picture is not suitable for interpretation since several operations are recorded on top of one another. As the various consecutive operations are not always absolutely identical, apparently unsharp pictures are produced which do not permit of convenient interpretation.

For that reason, photographic diagram recording with a single sweep of the cathode-ray oscilloscope has generally been found to be the most satisfactory solution. However, with this recording method it is only possible to produce either a compression or a charge variance diagram, depending on how the triggering of the cathode-ray oscilloscope has been set.

As a logical developement of conventional arrangements for the recording and interpretation of oscillograms an appliance has been devised which eliminates the difficulties inherent in conventional recording methods as referred to as above. According to the invention, this progress is achieved by the application of bistable switch stages whose inputs are connected to the pulse shaper, each of their outputs being connected via a diode with the trigger input of the cathode-ray oscilloscope, further by a common impulse line leading to the inverse input of the first bistable stage and to the input of the second bistable stage for the initiation of a reset pulse, as well as by coupling the inverse output of the first bistable stage with the inverse input of the second bistable stage, the two bistable switch stages being maintained in an inverse switching condition in relation to each other, inversion of one of the two bistable switch stages by means of a square-wave pulse of the pulse shaper stage for the release of a trigger pulse for the cathode-ray oscilloscope being consequently possible only in the absence of a reset pulse. For the recording of an oscillogram it is thus necessary to release the recording appliance, such as a camera shutter, at the same time interrupting the reset pulse. In the switching arrangement according to the invention this is followed by the consecutive release of two trigger pulses to the cathode-ray oscilloscope so that two trigger marks are at any one time gated into the recorded total diagram. The reset pulse following the recording operation immediately restores readiness of the appliance for further use, so that the recording operation can be repeated as required.

An oscillogram produced by this method provides a sharp picture of the pressure pattern over a complete cycle of the indexed engine with accurately gated trigger marks, absolutely suitable for interpretation. The device according to the invention will be explained in greater detail by the following description with reference to the accompanying circuit diagram.

The pulses released by the electromagnetic impulse pick-up 1 are transmitted via a limiting stage 2 to a pulse shaper stage 3 and transformed into square wave impulses 12 appropriately coordinated to the location of the indicator elements independently of the prevailing speed. The pulse shaper stage 3 is followed by two bistable switch stages 4 and 5 whose inputs 6 and 6' are connected to the pulse shaper 3, each of their outputs 7 and 7' being connected via a diode 10 and 10' respectively with the common output 14 leading to the cathode-ray oscilloscope (not shown). For the initiation of a reset pulse, an impulse line 11 is provided which is connected both to the inverse input 8 of the first bistable stage 4 and to the input 6' of the second bistable stage 5. In addition, connection is provided between the inverse output 9 of the first bistable stage 4 and the inverse input 8' of the second bistable stage 5.

The operation of the device is as follows: In the switching phase illustrated in the drawing, where line 11 is loaded by a reset pulse, the bistable stage 4 is maintained in the right-hand stable position and the second bistable stage 5 in the left-hand stable position by means of the reset pulse. The square wave impulses 12 released by the pulse shaper stage 3 to the two inputs 6 and 6' at intervals of 180° crank angle each for two-stroke engines and of 360° crank angle each for four-stroke engines remain at first ineffective since on the one hand, the reset pulse prevents inversion of the switch stage 4 and on the other hand, switch stage 5 already occupies the left-hand stable position.

If and when the reset pulse fails, the square wave pulses 12 become effective. The first arriving pulse 12 shifts the bistable stage 4 into the left-hand stable position, a pulse 13 being released at its output 7 via a diode 10 to the output 14 for the triggering of the cathode-ray oscilloscope. The same first impulse 12 also arrives at the input 6' of the second bistable stage 5 occupying the left-hand stable position and consequently remains without effect. When inversed, the first bistable stage 4 releases an impulse to its inverse output 9, the said impulse arriving at the inverse input 8' of the second bistable stage 5 and shifting the same to the right-hand position. The impulse thus arriving at the output 7' of this stage cannot, however, reach the output 14, since this impulse is of the opposite polarity and unable to pass the diode 10.

The second input impulse 12 now following resets the stage 5 to its left-hand stable position, the impulse released at the output 7' of the stage 5 arriving via the diode 10 at the output 14 and releasing the cathode-ray oscilloscope for the second time. None of the subsequent input pulses 12 will produce an output pulse since the two bistable stages 4 and 5 remain in the left-hand position so that the input pulses will no longer become effective. Another reset pulse 11 is needed to reset the two switch stages to their initial positions in inverse relation to each other, whereupon the device is again ready for use.

I claim:

1. A device for the twice-repeated triggering of a cathode-ray oscilloscope by means of successive signals of an impulse generator, particularly for the indication of internal combustion engines and compressors with an impulse sequence at intervals of 180° crank angle each for two-stroke engines and 360° crank angle for four-stroke engines, for the joint recording of the compression and of the charge variance diagrams in an oscillogram, comprising an electromagnetic pick-up producing the said signals, a limiting stage following the said impulse pick-up, a pulse shaper stage following the said limiting stage and transforming the said signals into square wave impulses, two bistable switch stages, their inputs being connected to the output of the said pulse shaper stage, two diodes, each being connected with the output of one of the bistable stages, the outputs of both diodes being connected with the trigger input of the said cathode-ray oscilloscope, an impulse line for the initiation of a common reset pulse for the said bistable switch stage, the said impulse line being connected to the inverse input of the first bistable switch stage and to the input of the second bistable switch stage, a connecting line connecting the inverse output of the first bistable stage with the inverse input of the second bistable stage.

References Cited

UNITED STATES PATENTS

| | | | |
|---|---|---|---|
| 2,402,432 | 6/1946 | Mumma | 328—48 |
| 2,466,207 | 4/1949 | Carpentier | 328—96 |
| 2,563,841 | 8/1951 | Jensen | 328—48 |
| 2,984,753 | 5/1961 | Della Salle | 307—247 |
| 3,035,187 | 5/1962 | Reichert | 328—48 |
| 3,047,737 | 7/1962 | Kolodin | 307—247 |
| 3,189,834 | 6/1965 | Slot | 328—61 |

JOHN S. HEYMAN, Primary Examiner.

H. A. DIXON, Assistant Examiner.

U.S. Cl. X.R.

328—231